US010216371B2

(12) United States Patent
Chen et al.

(10) Patent No.: US 10,216,371 B2
(45) Date of Patent: Feb. 26, 2019

(54) METHOD AND ELECTRONIC APPARATUS FOR ASSOCIATING NOTE AND CALENDAR EVENT

(71) Applicant: HTC Corporation, Taoyuan County (TW)

(72) Inventors: Ying-Ju Chen, Taoyuan County (TW); David Folchi, Bellevue, WA (US)

(73) Assignee: HTC CORPORATION, Taoyuan (TW)

( * ) Notice: Subject to any disclaimer, the term of this patent is extended or adjusted under 35 U.S.C. 154(b) by 241 days.

(21) Appl. No.: 13/762,384

(22) Filed: Feb. 8, 2013

(65) Prior Publication Data

US 2013/0212492 A1     Aug. 15, 2013

Related U.S. Application Data

(60) Provisional application No. 61/597,839, filed on Feb. 13, 2012.

(51) Int. Cl.
*G06F 3/0484*     (2013.01)
*G06Q 10/10*      (2012.01)

(52) U.S. Cl.
CPC ......... *G06F 3/0484* (2013.01); *G06Q 10/109* (2013.01)

(58) Field of Classification Search
CPC ............... G06Q 10/06; G06Q 10/0631; G06Q 10/06311; G06Q 10/063116; G06Q 10/06314; G06Q 10/109; G06Q 10/1093; G06Q 10/1095; G06Q 10/1097
USPC ........................................................ 715/751
See application file for complete search history.

(56) References Cited

U.S. PATENT DOCUMENTS

| 5,806,079 A * | 9/1998 | Rivette ............. G06F 17/30014 707/E17.008 |
| 7,370,282 B2 * | 5/2008 | Cary .............................. 715/772 |
| 8,370,763 B1 * | 2/2013 | Moore ...................... G06F 3/01 715/752 |
| 2004/0168133 A1 | 8/2004 | Wynn et al. |
| 2006/0277087 A1 | 12/2006 | Error |
| 2007/0106931 A1 * | 5/2007 | Vartiainen et al. ........... 715/512 |
| 2007/0143376 A1 * | 6/2007 | McIntosh ............. G06Q 10/109 |
| 2008/0059618 A1 * | 3/2008 | May ..................... G06Q 10/109 709/223 |
| 2008/0222170 A1 | 9/2008 | Farnham et al. |
| 2008/0244442 A1 * | 10/2008 | Veselova ............... G06F 9/4443 715/781 |

(Continued)

FOREIGN PATENT DOCUMENTS

| EP | 1338967 | 8/2003 |
| TW | I351866 | 11/2011 |

OTHER PUBLICATIONS

"Search Report of European Counterpart Application", dated Jun. 26, 2013, p. 1-p. 3.

(Continued)

*Primary Examiner* — Kevin L Young
*Assistant Examiner* — Seth A Silverman
(74) *Attorney, Agent, or Firm* — JCIPRNET

(57) ABSTRACT

A method and an electronic apparatus for associating a note and a calendar event are provided. In the method, when the note is added, at least one event with an event time close to a creating time of the note is inquired from a plurality of events recorded in a calendar, and the note is associated with one of the events.

18 Claims, 7 Drawing Sheets

(a)                (b)                (c)                (d)

(56) References Cited

U.S. PATENT DOCUMENTS

2008/0306963 A1* 12/2008 Adler et al. .................. 707/10
2009/0066650 A1*  3/2009 Bells ...................... G06Q 10/00
                                                        345/167

OTHER PUBLICATIONS

"Office Action of Taiwan Counterpart Application", dated Sep. 30, 2014, p. 1-p. 8.

* cited by examiner

METHOD AND ELECTRONIC APPARATUS FOR ASSOCIATING NOTE AND CALENDAR EVENT

CROSS-REFERENCE TO RELATED APPLICATION

This application claims the priority benefits of U.S. provisional application Ser. No. 61/597,839, filed on Feb. 13, 2012. The entirety of the above-mentioned patent applications is hereby incorporated by reference herein and made a part of this specification.

BACKGROUND

To cope with the busy lifestyle of modern people, various smart mobile devices occupying less space and easy to carry are developed. For example, personal digital assistants (PDA), PDA phones and smart phones not only have various functions of conventional communication device, but provide a user with functions of writing documents, transceiving e-mails, browsing websites or even using instant messaging software through a windows operating system built therein.

Along with widespread of the smart mobile devices, the user has become accustomed to handle daily routine by using diversified application programs provided by the mobile device. A calendar is provided for a user to record events occurred in the past or to be occurred in the future and set reminders for the future events to facilitate opportune handling, and a note is provided for a user to record details of current things at anytime and anywhere so as to facilitate later inquiry.

However, the current note and calendar in the mobile devices are both independent applications without association there between. Therefore, when the user intends to add a note in the notebook to the calendar, the user has to manually copy and paste the note, and has no consciousness about the association between the note and the event in the calendar in writing the note.

SUMMARY

Accordingly, the application is directed to a method and an electronic apparatus for associating note and calendar event, which is capable of automatically searching an event related to a currently added note from a calendar to establish association, so as to facilitate a user to switch there between to browse and share required information.

The application provides a method for associating a note and a calendar event, which is adapted to an electronic apparatus. In the method, when the note is added, at least one event with an event time close to a creating time of the note is inquired from a plurality of events recorded in a calendar, and the note is associated with one of the events.

In an example of the application, the step of adding the note includes activating a notebook function to display a notebook and adding the note to the notebook, or activating a calendar function to display the calendar and adding the note to the calendar.

In an example of the application, the step of associating the note to the event includes associating the note to the event with the event time closest to the creating time of the note, or associating the note with the event selected by a user.

In an example of the application, after the step of associating the note to the event, the method further includes following steps. A calendar link object is displayed in the note, and a link menu of the event associated with the note is displayed when the calendar link object is selected, where the link menu includes a plurality of options for displaying the event, changing the event and removing a link of the event. Finally, when one of the options is selected, a function corresponding to the option is executed.

In an example of the application, after the step of associating the note to the event, the method further includes displaying a note list including the note, and extracting a name of the event associated with the note and displaying the same in a field of the note list corresponding to the note.

In an example of the application, after the step of associating the note to the event, the method further includes activating a calendar function to display the calendar, and displaying a thumbnail of the note associated with the event when event content of one of the events in the calendar is displayed.

In an example of the application, after the step of displaying the thumbnail of the note associated with the event, the method further includes open the note corresponding to the thumbnail when the thumbnail is selected, so as to display complete content of the note.

In an example of the application, after the step of associating the note to the event, the method further includes establishing a share of the note, and extracting a related document of the event associated with the note for adding as an attachment of the share, and finally sending the share containing the attachment.

In an example of the application, before the step of sending the share containing the attachment, the method further includes extracting contact information of attendees of the event associated with the note, and sending the share containing the attachment to each of or a part of the attendees according to the contact information.

The application provides an electronic apparatus for associating a note and a calendar event including a note module, a calendar module and an association module. The note module is configured to add the note. The calendar module is configured to inquire at least one event with an event time close to a creating time of the note from a plurality of events recorded in a calendar. The association module is configured to associate the note with one of the events.

In an example of the application, the note module activates a notebook function to display a notebook and adds the note to the notebook.

In an example of the application, the calendar module activates a calendar function to display the calendar, and the note module adds the note to the calendar.

In an example of the application, the association module associates the note to the event with the event time closest to the creating time of the note, or associates the note with the event selected by a user.

In an example of the application, the note module further displays a calendar link object in the note, and displays a link menu of the event associated with the note when the calendar link object is selected, where the link menu includes a plurality of options for displaying the event, changing the event and removing a link of the event, and executes a function corresponding to the option when one of the options is selected.

In an example of the application, the note module displays a note list including the note, and extracts a name of the event associated with the note and displays the same in a field of the note list corresponding to the note.

In an example of the application, the calendar module displays a thumbnail of the note associated with the event when event content of one of the events in the calendar is displayed, and notifies the note module to activate the note corresponding to the thumbnail when the thumbnail is selected, so as to display complete content of the note.

In an example of the application, the electronic apparatus further includes a share module, which is configured to establish a share of the note, and extract a related document of the event associated with the note for adding as an attachment of the share, and send the share containing the attachment.

In an example of the application, the share module further extracts contact information of attendees of the event associated with the note, and sends the share containing the attachment to each of or a part of the attendees according to the contact information.

According to the above descriptions, according to the method and the electronic apparatus for associating note and calendar event of the application, when the user adds a new note, an event close in timing is searched from the calendar to establish association, so that the user can quickly reach and access the associated data when the user browse the note or the calendar later.

In order to make the aforementioned and other features and advantages of the application comprehensible, several exemplary examples accompanied with figures are described in detail below.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DETAILED DESCRIPTION OF DISCLOSED EXAMPLES

Regarding a note added within or before and after a predetermined time of a certain event in a calendar, the association between the note and the calendar event is relatively high. For example, when a user activates a notebook function to write a note during or after a meeting, it is deduced that the note has a great change for relating to the meeting. According to the above concept, the functions of the note and the calendar are linked up, such that each time when the user adds a new note by using the note function, an event preset in the calendar is automatically searched, so as to associate the note to an event close in timing. In this way, the user can quickly switch between the note and the calendar during browsing, so as to obtain or share required information.

Figure 1:
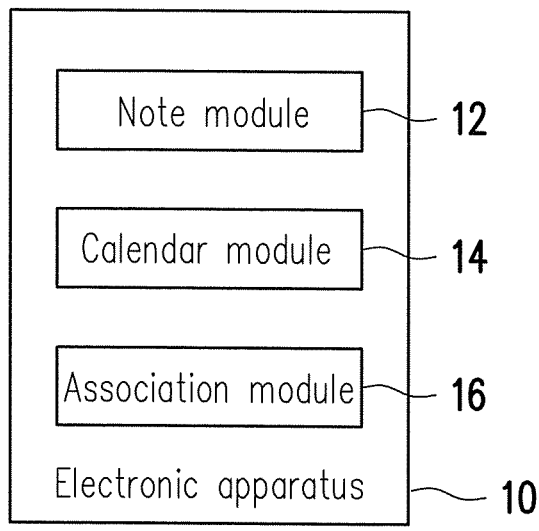
FIG. 1 is a block diagram of an electronic apparatus for associating a note and a calendar event according to an example of the application.

FIG. 1 is a block diagram of an electronic apparatus for associating a note and a calendar event according to an example of the application. Referring to FIG. 1, the electronic apparatus 10 of the present example includes a note module 12, a calendar module 14 and an association module 16. The association module 16 is electrically connected to the note module 12 and the calendar module 14, and these modules are, for example, hardware devices composed of logic circuit components, and are capable of executing a function of associating the note and the calendar event. The electronic apparatus 10 can be, for example, installed or equipped in a mobile phone, a tablet PC, a notebook computer, etc. to facilitate the user of the electronic apparatus to quickly switch between the notebook and the calendar so as to search required information.

Figure 2:
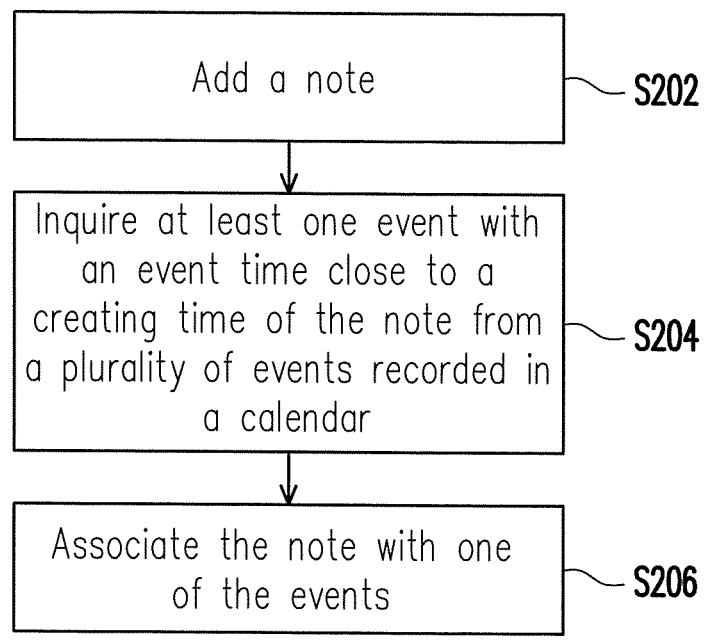
FIG. 2 is a flowchart illustrating a method for associating a note and a calendar event according to an example of the application.

FIG. 2 is a flowchart illustrating a method for associating a note and a calendar event according to an example of the application. Referring to FIG. 1 and FIG. 2, the method of the present example is adapted to the aforementioned electronic apparatus 10. The method of the present example is described in detail below with reference to various components of the electronic apparatus 10 of FIG. 1.

First, according to an operation of the user on the electronic apparatus, the note module 12 adds a note (step S202). Then, the calendar module 14 inquires at least one event with an event time close to a creating time of the note from a plurality of events recorded in a calendar (step S204). In an example, in the electronic apparatus 10, the note module 12 activates a notebook function to display a notebook, and adds the note to the notebook. In another example, in the electronic apparatus 10, the calendar module 14 first activates a calendar function to display the calendar, and then the note module 12 adds the note to the calendar.

It should be noticed that an executing sequence of the above steps S202 and S204 can be exchanged according to user's habit, which is not limited by the application. In detail, in another example, the note module 12 may display an operation interface of the notebook when the user activates the notebook function of the electronic apparatus, such that when the user presses an add key on the operation interface, a blank note is displayed to facilitate the user inputting text, and when the user presses a finish button on the operation interface, the note edited by the user is recorded in a storage medium. It should be noticed that the aforementioned blank note may include a title or other information of the calendar according to an actual application requirement, which is not limited by the application. While the note module 12 receives the operation of pressing the add key or the finish key, the calendar module 14, for example, automatically inquires an event close in timing in the calendar, and displays the same on a screen of the electronic apparatus so as to facilitate the user to select and establish association.

In detail, the calendar module 14 can inquire whether an event time of the event falls within a creating time range of the note, so as to determine whether the event time is close to the creating time of the note. For example, if the note is created at 8 a.m., and the creating time range thereof is one hour, the event time between 7 a.m. to 8 a.m., 8 a.m. to 9 a.m. or 7 a.m. to 9 a.m. is considered to be close to the creating time of the note.

In another example, when the user activates the notebook function of the electronic apparatus, the calendar module 14 of the note module 12 first inquires an event with the event time close to an activating time of the notebook function from a plurality of the events recorded in the calendar, so as to deduce the event that the user probably participates and display the event on the operation interface of the notebook, such that when the user adds a note, the added note can be directly associated with the event in the calendar.

Figure 3A:
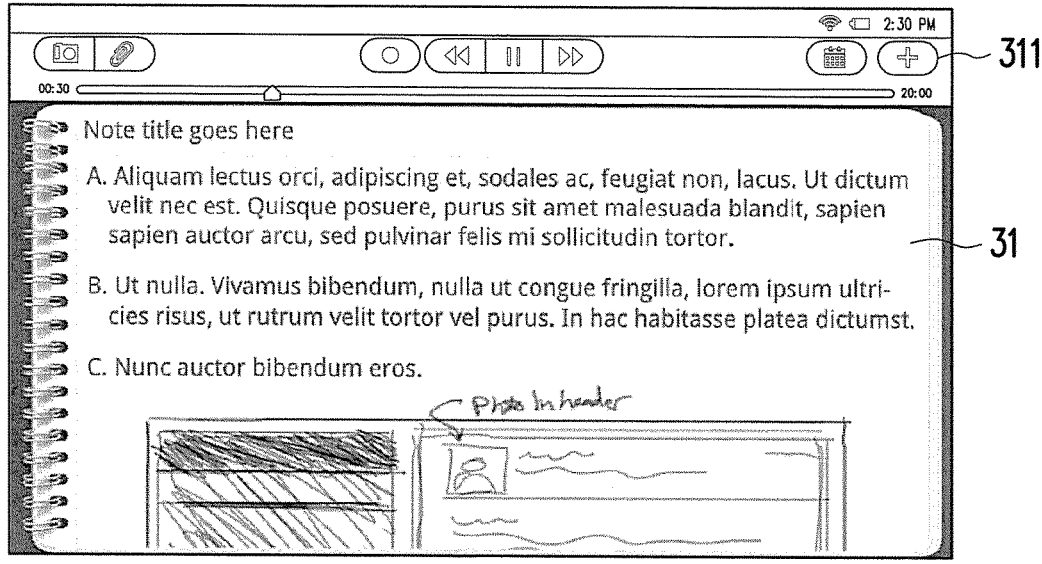
FIG. 3A to FIG. 3C illustrate an example of a method for associating a note and a calendar event according to an example of the application.
Figure 3B:
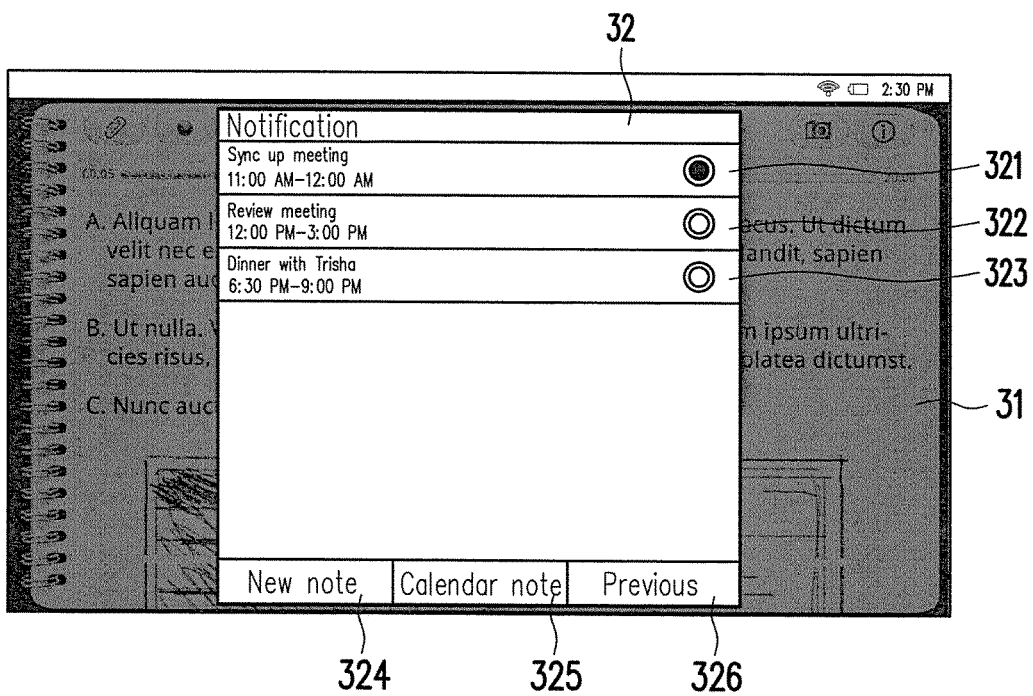
Figure 3C:
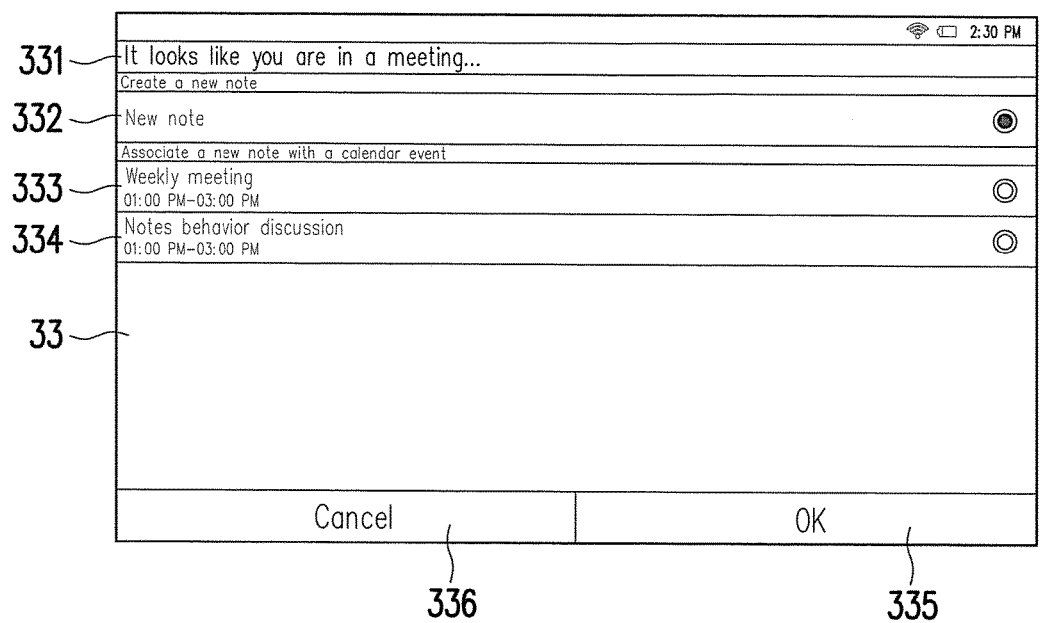

For example, FIG. 3A to FIG. 3C illustrate an example of a method for associating a note and a calendar event according to an example of the application. Referring to FIG. 3A, when the user activates an application program of the notebook, the electronic apparatus, for example, displays an editing interface 31 of the note to facilitate the user inputting text or inserting pictures, voice records or other attachments. Then, referring to FIG. 3B, after the user completes a note and presses an add key 311 or a finish key (not shown), etc., the electronic apparatus displays an event list 32 on the editing interface 31, and according to a creating time of the note, the electronic apparatus searches events 321, 322 and 323 with the event time close to the creating time from the calendar, and displays these events in the event list 32 to facilitate the user selecting the same to establish association.

A plurality of function keys are, for example, listed below the event list 32, such that the user can click a new note key 324 to stored the edited note as a general note (the association is not established); or click a calendar note key 325 to associate the edited note with the selected calendar event, and store the same as a calendar note; or click a previous key 326 to go back to the editing interface 31 of the note. Finally, referring to FIG. 3C, in another example, when the user activates the application program of the notebook, the electronic apparatus may directly search an event with the event time close to a current time from the calendar according to the current time, and display information of a search result (the user is probably in a meeting) in a title 331 of a note adding interface 33. Moreover, the electronic apparatus further provides a plurality of options in the adding interface 33 to facilitate the user creating a general note (the association is not established) by selecting a new note 332 or selecting an event 333 or 334 to establish association therewith. Finally, the user can add a general note or a calendar note by clicking a confirm key 335, or cancel the operation of adding note by clicking a cancel key 336.

Referring back to the flow of FIG. 2, after the calendar module 14 inquires the events related to the note in the calendar, the association module 16 associates the note with one of the events (step S206). The association module 16, for example, finds the event with the event time closest to the creating time of the note from the events so as to establish the association between the event and the note, or according to the event selected by the user from the event list inquired by the calendar module 14, the association module 16 associates the note with the event selected by the user, which is not limited by the application.

According to the above association method, the note edited by the user can be associated with the calendar event, and regarding the associated note, a link object is provided in the operation interface of the notebook and the calendar to facilitate the user quickly switching the notebook and the calendar to browse required information.

In detail, regarding the associated note, the note module 12, for example, displays a calendar link object in the editing interface of the note for the user to select. When the calendar link object is selected, the note module 12 displays a link menu of the event associated with the note for the user to further select and execute a function corresponding to the link. The link menu includes a display calendar event option, a modify calendar event option and a remove calendar link option, etc., which is not limited by the application.

Figure 4:
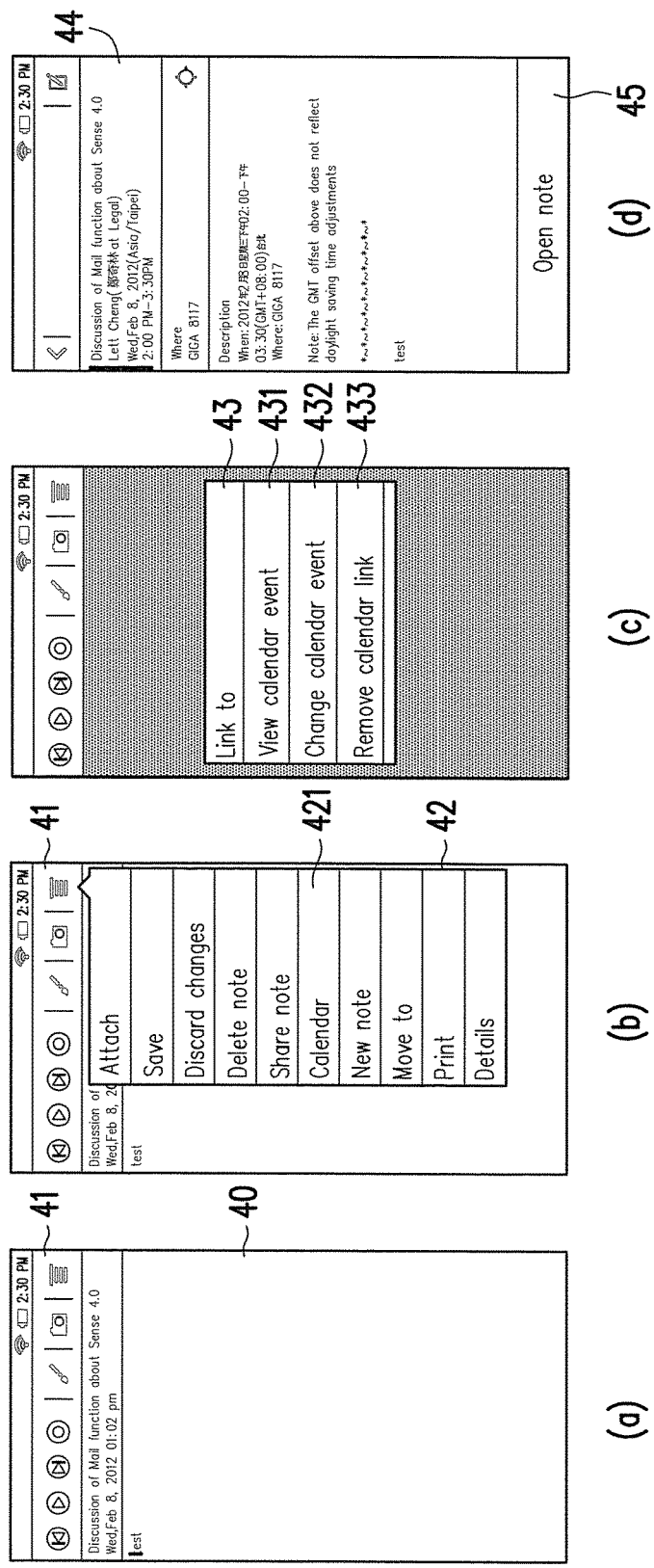
FIG. 4(a) to FIG. 4(d) illustrate an example of links between a notebook and a calendar according to an example of the application.

For example, FIG. 4(a) to FIG. 4(d) illustrate an example of links between the notebook and the calendar according to an example of the application. Referring to FIG. 4(a), a menu key 41 is displayed in an editing interface 40 of the notebook. When the user clicks the menu key 41, the electronic apparatus displays a function list 42 extended from the menu key 41 (as that shown in FIG. 4(b)), where the function list 42 includes a calendar link option 421. When the user selects the calendar link option 421, the electronic apparatus displays a link menu 43 of the calendar event associated with the note (as that shown in FIG. 4(c)). The link menu 43 includes an option 431 for displaying the calendar event, an option 432 for changing the calendar event and an option 433 for removing the calendar link for the user to select, so as to execute a corresponding function. Finally, when the user selects the option 431, the electronic apparatus calls a browsing interface 44 of the calendar event, and displays details of the event associated with the note in the calendar therein. An option 45 for opening a note is further provided at the bottom of the browsing interface 44 for the user to select, so as to go back to the editing interface 40 of the notebook as that shown in FIG. 4(a) to facilitate the user modifying the note. It should be noticed that in the aforementioned example, the link of the calendar event is displayed in a form of option, and in other examples, the link of the calendar event can also be independently displayed in an icon or a thumbnail, etc., and the user can click the icon or the thumbnail to quickly switch to the calendar, which is not limited by the application.

Moreover, in an example, the note module 12 may display a note list edited and stored in the electronic apparatus, and regarding the note associated with the calendar event, the note module 12 extracts a name of the event associated with the note and displays the same in a field of the note list corresponding to the note to facilitate user's browsing.

Figure 5:
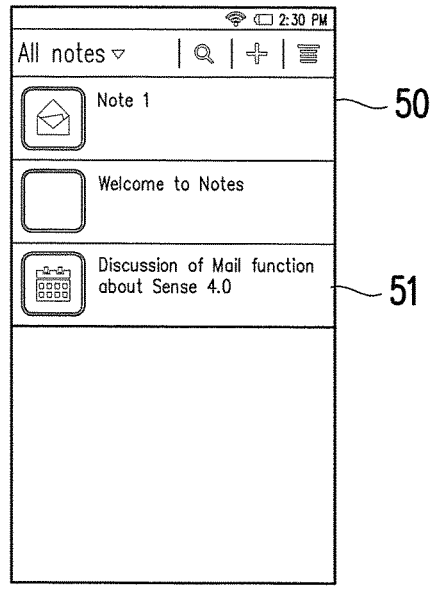
FIG. 5 illustrates an example of a note list according to an example of the application.

For example, FIG. 5 illustrates an example of a note list according to an example of the application. Referring to FIG. 5, the note list 50, for example, lists all of the notes edited by the user and stored in the electronic apparatus. Since a note 51 has been associated with the calendar event, the electronic apparatus extracts the name of the calendar event to serve as a title of the note 51, and displays the same in the field of the note 51. According to the above automatic naming mechanism of the note, time spent on naming is saved.

Moreover, regarding the calendar event associated with the note, when the calendar module 14 displays the content of the calendar event, the calendar module 14 simultaneously displays a thumbnail of the note associated with the event so as to facilitate the user clicking the same to browse detailed note content. In detail, when the thumbnail is clicked, the calendar module 14 notifies the note module 12 to activate the note corresponding to the thumbnail, so as to display complete content of the note.

Figure 6:
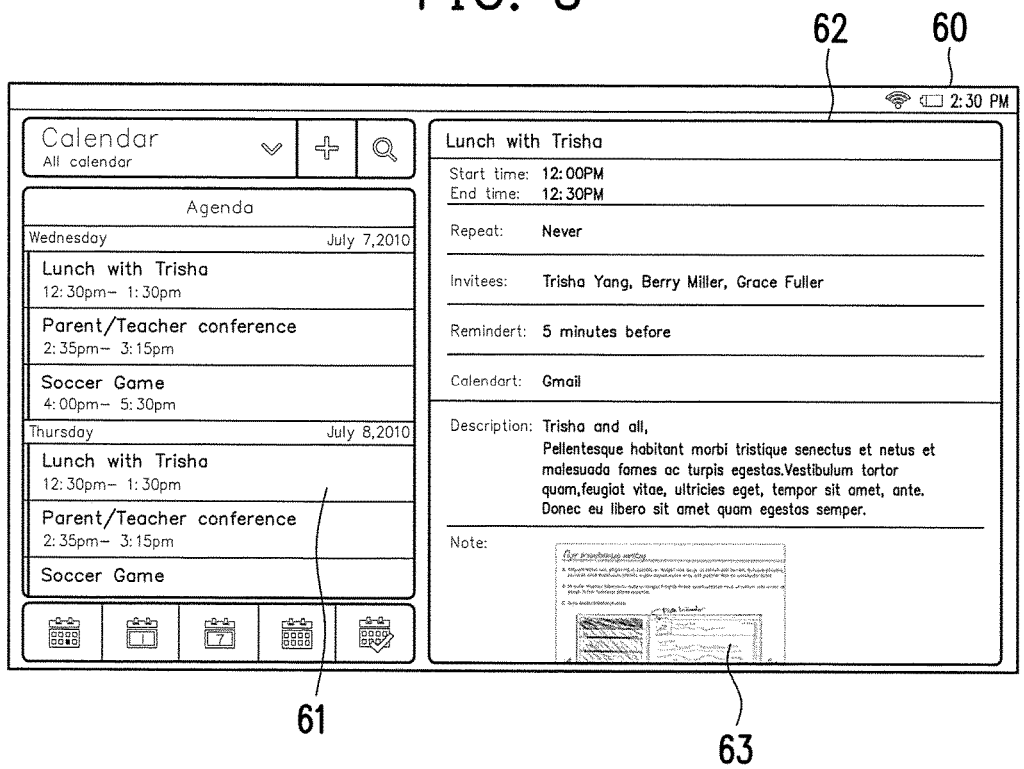
FIG. 6 illustrates an operation interface of a calendar according to an example of the application.

For example, FIG. 6 illustrates an operation interface of a calendar according to an example of the application. Referring to FIG. 6, when the user click an event 61 in the operation interface 60 of the calendar, the electronic apparatus displays event content 62 on the right side of the operation interface 60, where the event content 62 includes general information of time, location and attendees, etc. Since the event 61 has been associated with a note (for example, the note shown in FIG. 3A), the electronic apparatus further displays a thumbnail 63 of the note at the bottom of the event content 62. In this way, the user can click the thumbnail 63 to open the note corresponding to the thumbnail 63, so as to display the complete content of the note.

Besides the link function between the note and the calendar event, the application further provides a sharing mechanism of note, by which when the user shares the note, a related document of the calendar event associated with the note is also shared, and the attendees of the calendar event can be automatically added to serve as sharing targets, which simplifies the operations performed by the user in sharing information.

Figure 7:
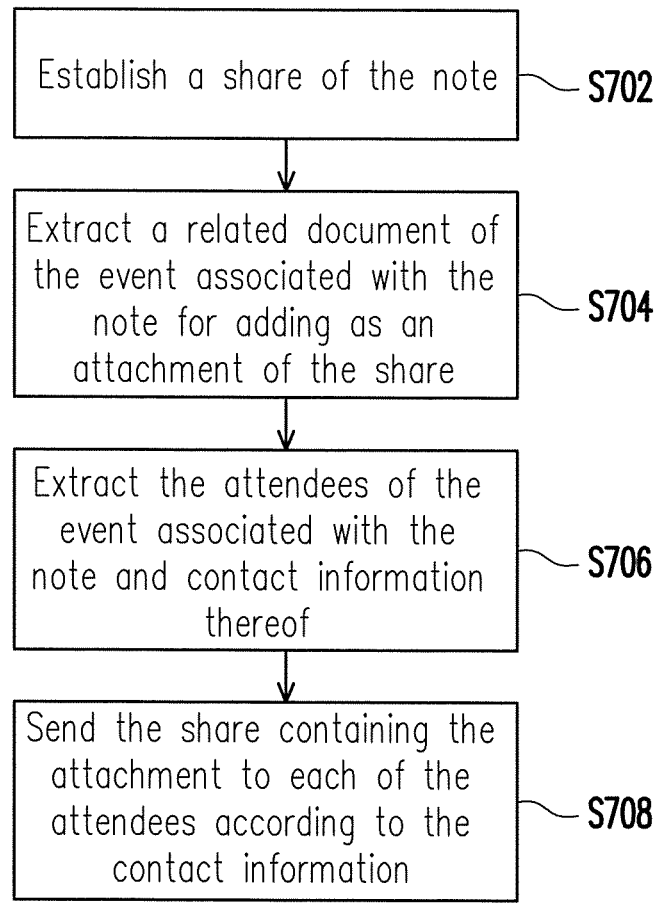
FIG. 7 is a flowchart illustrating a method for sharing a note and an associated calendar event according to an example of the application.

FIG. 7 is a flowchart illustrating a method for sharing a note and an associated calendar event according to an example of the application. Referring to FIG. 7, the method of the present example follows the step S206 of FIG. 2, and is adapted to a share module (not shown) in the electronic apparatus, where the share module is electrically connected to the note module 12. The share module is electrically connected to the association module 16, and may produce information such as a message, an instant message, an e-mail and social networking, etc., which facilitates the user to share the edited note and related data to others. Detailed steps of the method of the present example are as follows.

First, the share module establishes a share of the note (step S702). The share is, for example, a message, an instant message or an e-mail, which may include a text description and an attachment such as an image file, an audio file or a video file.

Then, the share module extracts a related document of the event associated with the note for adding as an attachment of the share (step S704). Regarding the documents recorded in allusion to the events in the calendar, since the note of the present example has been associated with the event in the calendar in advance, while establishing the share, the share module can obtain related documents of the events by simply notifying the calendar module.

Similarly, regarding the attendees recorded in allusion to each of the events in the calendar, while establishing the share, the share module may also extract the attendees of the event associated with the note and contact information thereof (S706). The share module can directly ask the calendar module to provide a list of the attendees of the event and the contact information thereof, or can first ask the calendar module to provide the list of the attendees and then search the contact information of the attendees from an address book established on the electronic apparatus or a remote server, which is not limited by the application.

Finally, the share module sends the share containing the attachment to each of the attendees according to the contact information (step S708). In this way, the user can implement synchronous share of the note, the calendar and the related document through a single operation (i.e. sharing a note), such that complicated steps for searching information and establishing the share are saved. Another example is provided below to describe the aforementioned method for sharing a note.

Figure 8:
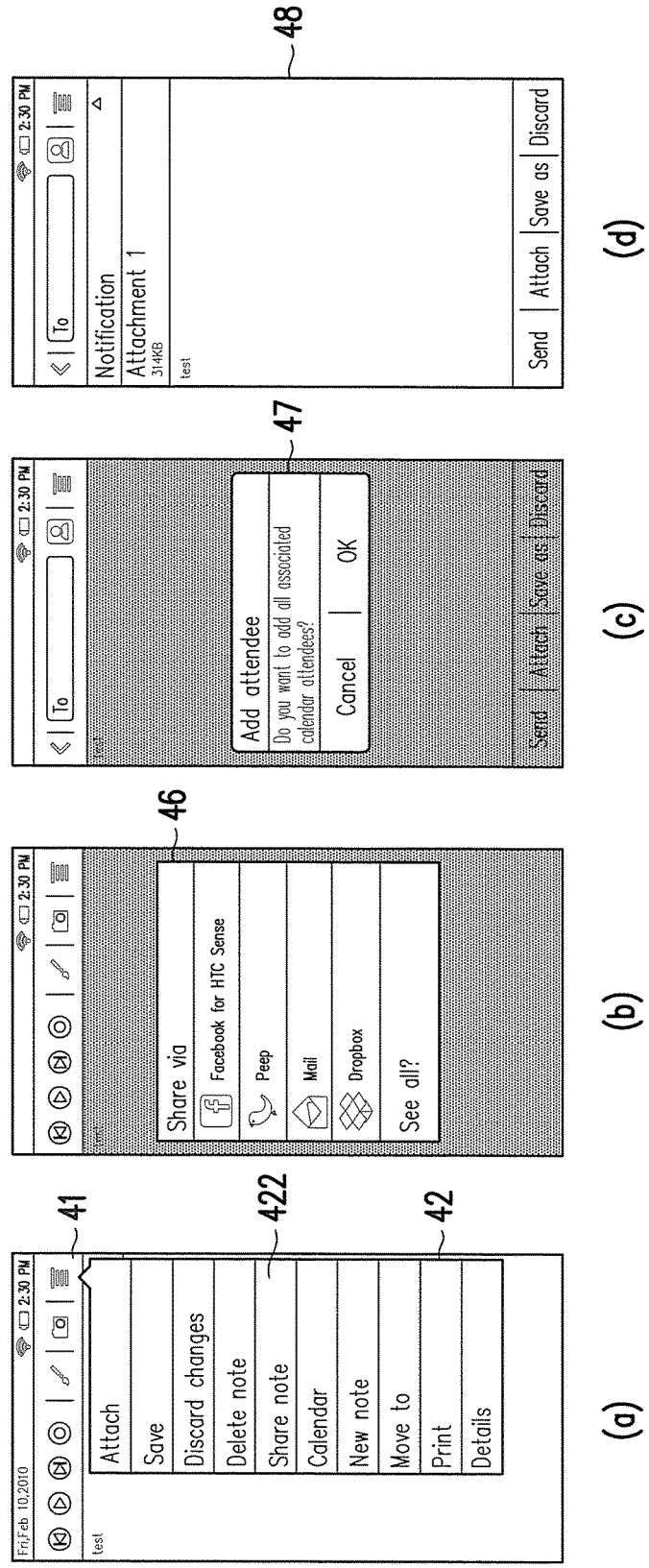
FIG. 8(a) to FIG. 8(d) illustrate an example of a method for sharing a note and a related calendar event according to an example of the application.

FIG. 8(a) to FIG. 8(d) illustrate an example of the method for sharing a note and a related calendar event according to an example of the application. Referring to FIG. 4(a) and FIG. 8(a), when the user clicks the menu key 31 in the editing interface 40 of the notebook, the function list 42 is extended from the menu key 41, and the function list 42 includes an option 422 for sharing a note. When the user clicks the option 422, the electronic device may first display a list 46 of share paths for the user to select a tool for sharing the note. After the user selects the tool, the electronic apparatus may further display a dialog box 47 to ask the user whether to add all of the attendees of the calendar event associated with the note as sharing targets. When the user selects to add all of the attendees of the calendar event, the electronic apparatus extracts a list of the attendees of the event and the contact infonnation thereof from the calendar, and extracts the related document of the event to establish the share 48 as shown in FIG. 8(d). The addressee of the share 48 includes the attendees of the calendar event, and the content of the share 48 includes the related document (for example, attachment 1) of the calendar event. In this way, synchronous share of the note, the calendar and the related document can be implemented through a simple operation.

In summary, according to the method and the electronic apparatus for associating note and calendar event of the application, according to a creating time of the note, the event close in timing is searched from the calendar to establish association, so that when the user browse the note or the calendar later, the user can quickly switch between the note and the calendar through the link therebetween, so as to search required information. Moreover, through the association between the note and the calendar event, the user can implement synchronous share of the note, the calendar and the related document through a single operation, so as to improve operation convenience of the electronic apparatus.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A method for associating and managing at least one calendar event to a newly created note, adapted to an electronic apparatus comprising a note module, a calendar module and an association module, wherein the association module is electrically connected to the note module and the calendar module to automatically associate the newly created note to the calendar module as to eliminate manual copy and paste of the newly created note to the calendar module, the method comprising: creating the note through the note module; in response to a completion of creating the note via an interface, performing the following steps comprising: automatically searching, through the calendar module, at least one scheduled event having scheduled time within a preset time range defined by a creation time of the created note among a plurality of scheduled events from the calendar and automatically directly associating the created note with the at least one scheduled event through the association module; displaying, through the note module, a plurality of functions for managing the at least one associated event via the interface displayed in the created note, in response to a click at a menu key of the displayed functions via the interface, displaying a function list including a calendar link object in the created note through the note module; in response to a selection of the calendar link object listed in the menu key, displaying a link menu of the associated event through the note module, wherein the link menu comprises a plurality of options respectively corresponding to the functions for viewing detail information of the associated event, changing the associated event and removing the calendar link of the associated event; and in response to a selection of one of the options, executing a function corresponding to the selected one option through the note module.

2. The method as claimed in claim 1, wherein the step of creating the note comprises:
activating a notebook function to display a notebook through the note module, and creating the note to the notebook.

3. The method as claimed in claim 1, wherein the step of creating the note comprises:
activating a calendar function to display the calendar through the calendar module; and
creating the note to the calendar through the note module.

4. The method as claimed in claim 1, wherein the step of associating the note to the at least one event comprises:
associating the created note with a selected event of the at least one event within the preset time range through the association module.

5. The method as claimed in claim 1, further comprising:
displaying a note list comprising the created note through the note module; and
extracting a name of the event associated with the created note through the note module, and displaying the name in a field of the note list corresponding to the created note.

6. The method as claimed in claim 1, further comprising: activating a calendar through the calendar module; and
displaying a thumbnail of the created note associated with the event through the calendar module when event content of the event in the calendar is displayed.

7. The method as claimed in claim 6, further comprising:
sharing the note module through the calendar module when the thumbnail is selected; and
opening the created note corresponding to the thumbnail through the note module, so as to display complete content of the created note.

8. The method as claimed in claim 1, wherein the electronic apparatus further comprises a share module electrically connected to the note module, and the method further comprises:
establishing a share of the created note through the share module;
extracting a related document of the event associated with the created note for adding as an attachment of the share through the share module; and
sending the share containing the attachment through the share module.

9. The method as claimed in claim 8, further comprising:
extracting contact information of at least one attendee of the event associated with the created note through the share module; and
sending the share containing the attachment to each of the attendees through the share module according to the contact information.

10. An electronic apparatus for associating and managing a scheduled to a newly created note, comprising:
a note module, configured to create the note;
a calendar module, configured to, in response to a completion of creating the note, automatically search at least one scheduled event having a scheduled time within a preset time range defined by a creation time of the created note among a plurality of scheduled events from the calendar; and
an association module, electrically connected to the note module and the calendar module, and configured to automatically directly associate the created note with the at least one scheduled calendar event, so as to eliminate manual copy and paste of the newly created note to the calendar module, wherein a plurality of functions for managing the at least one associated event via the interface displayed in the created note,
in response to a click at a menu key of the displayed function via the interface, the note module displays a function list including a calendar link object in the created note,
wherein, in response to a selection of the calendar link object, the note module displays a link menu of the associated event, wherein the link menu comprises a plurality of options respectively corresponding to the functions for viewing detail information of the associated event, changing the associated event and removing the calendar link of the associated event,
wherein, in response to a selection of one of the options, the note module executes a function corresponding to the selected one option.

11. The electronic apparatus as claimed in claim 10, wherein the note module activates a notebook and creates the note to the notebook.

12. The electronic apparatus as claimed in claim 10, wherein the calendar module activates the calendar, and the note module creates the note to the calendar.

13. The electronic apparatus as claimed in claim 10, wherein the association module associates the created note with a selected event of the at least one event within the preset time range.

14. The electronic apparatus as claimed in claim 10, wherein the note module further displays a note list comprising the created note, extracts a name of the event associated with the created note and displays the same in a field of the note list corresponding to the created note.

15. The electronic apparatus as claimed in claim 10, wherein the calendar module displays a thumbnail of the created note associated with the event when event content of the event in the calendar is displayed.

16. The electronic apparatus as claimed in claim 10, wherein the calendar module notifies the note module to activate the created note corresponding to the thumbnail when the thumbnail is selected, so as to display complete content of the created note.

17. The electronic apparatus as claimed in claim 10, further comprising:
a share module, electrically connected to the note module, and configured to establish a share of the created note, extract a related document of the event associated with the created note for adding as an attachment of the share, and send the share containing the attachment.

18. The electronic apparatus as claimed in claim 17, wherein the share module further extracts contact information of at least one attendee of the event associated with the created note, and sends the share containing the attachment to the at least one attendee according to the contact information.

* * * * *